June 23, 1959  F. WOOD  2,891,317
SELF MASTERING DEVICE FOR PRECISION SETTING OF TOOL BITS
Filed April 8, 1957

INVENTOR
Frederick Wood
BY
Wooster & Davis
ATTORNEYS

United States Patent Office 2,891,317
Patented June 23, 1959

2,891,317

SELF MASTERING DEVICE FOR PRECISION SETTING OF TOOL BITS

Frederick Wood, Fairfield, Conn.

Application April 8, 1957, Serial No. 651,401

8 Claims. (Cl. 33—185)

This invention relates to a self-mastering device for precision setting of tool bits, and has for an object to provide a simple and effective device by means of which the bits, such, for example, as a bit in a boring bar, may be accurately set according to a master gauging surface, and the same or different tools may be similarly set without difficulty, and accurately, in successive operations.

It is also an object to provide an improved construction whereby the operation of setting such a tool bit is greatly simplified over the ordinary constructions, and the bit can always be accurately set to the same setting.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 2:
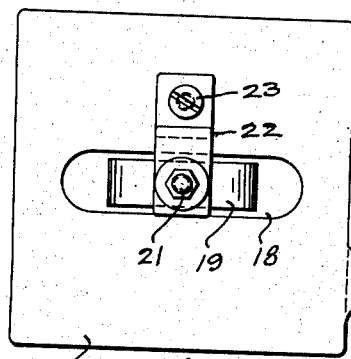
Fig. 2 is a top plan view thereof.
Figure 4:
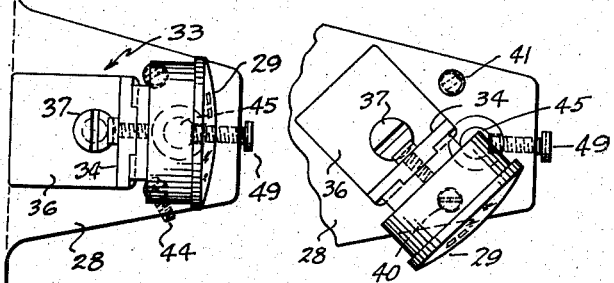
Fig. 4 is a top plan view of a portion of the device indicating a part of the operation of using the device.
Figures 1, 3:
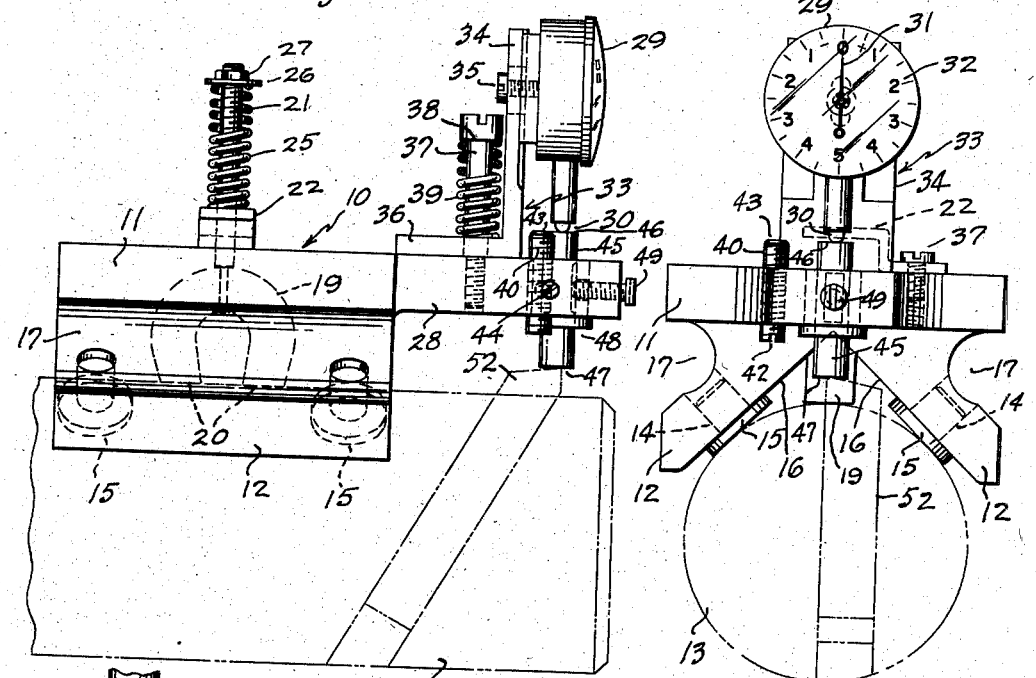
Fig. 1 is a side view of the device with parts broken away and indicating by broken lines how the device may be used for setting a tool bit in a boring bar, for example.
Fig. 3 is an end view looking from the right of Fig. 1.
Figures 5, 6:
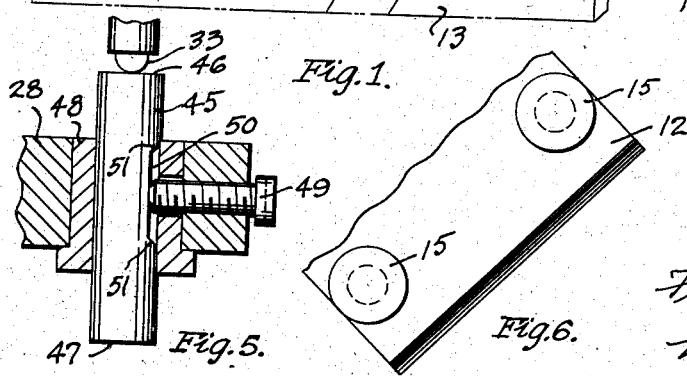
Fig. 5 is a vertical section on an enlarged scale of the mounting for the gauging pin.
Fig. 6 is a face view of a part of the locating means for the device.

This improved device comprises a body member 10 including a top plate 11 having on the under side thereof downwardly and outwardly inclined extensions 12 extending longitudinally of plate 11 and forming with it a V-block provided with locating surfaces for locating the device on a tool holder, such, for example, as a boring bar 13, in this case shown as a cylindrical bar. The positioning surfaces may be on the inner surfaces of the members 12, and in the form shown comprise plugs 14, a pair on each of the members 12 with the members of each pair longitudinally spaced, and having hardened flanges 15 located on the inner surfaces of the members 12 for engaging the surfaces of the tool holder such, for example, as a boring bar 13, to locate the device thereon. The inner surfaces 16 of the members 12 may be at any desired angle to each other in different planes, but are preferably at substantially right angles as shown. With this arrangement it automatically centers itself on bars of different diameters. The outer surfaces of the members 12 may be undercut or longitudinally channeled, as indicated at 17, immediately under the plate 11 to provide an improved finger grip at opposite edges of the top plate to facilitate handling and use of the device.

Means is provided for locating and holding the device on a tool holder, and the preferred means is a magnet for engaging the tool holder and acting through a spring to retain the device in position on the holder, as this is more accurate than would be a clamping device which, when set up, is likely to draw the device out of position, and due to variations in the pressures for setting it up would be difficult to locate in the same place in successive operations on the tool holder. In the present arrangement the top plate 11 is provided with an elongated opening 18 between the members 12, in which is mounted the magnet 19, preferably in the form of a permanent horseshoe magnet arranged with its poles 20 extending downwardly from the plate 11 between the members 12 in position to engage the tool holder 13. It is mounted on a threaded stem or stud 21 passing through an angularly shaped bracket 22 mounted by any suitable means, such as a screw 23, on the top of the plate 11, this stud being adapted to slide vertically in the bracket 22. Embracing the stud is a coil spring 25 engaging at its opposite ends on top of the bracket 22, and a washer 26 adjustably secured at its upper end by a nut 27. With this arrangement the pull of the magnet on the body member 10 when it engages the tool holder is through the spring 25, and the tension of the spring may be adjusted by the nut 27. This very effectively holds the device in proper position on the tool holder 13 without the setting up of any clamps or similar devices, and the successive mounting of the device on the holder is accurately secured in the same position.

At one end the plate 11 includes an extension 28 projecting beyond the ends of the members 12, and on this extension is mounted the gauging means. This comprises any suitable gauge, such, for example, as a dial gauge 29 having a gauging stem 30 to engage the gauging surface for tool setting purposes and operating a pointer 31 over a calibrated dial 32. This gauge is mounted for vertical adjustment in a suitable gauge support or bracket 33 mounted on top of the extension 28 for movement between given positions on the plate for the gauging operation. A simple and effective construction for this gauge support is an L-shaped member including an upright portion 34 on which the gauge 29 is adjustably mounted for vertical movement, and secured by any suitable means, such, for example, as the screw 35. The support also includes a horizontal or base member 36 pivotally mounted on the plate 28 by a pivot stud or screw 37 threaded into the plate and passing through the base portion 36. This stud or screw 37 has an upper head providing a shoulder 38 between which and the base 36 is a coil compression spring 39. This permits the holder 33 and the gauge 29 to be swung to different positions on the extension 28 about an upright axis for the gauging operation.

Mounted in the extension 28 are one or more master gauging pins 40 and 41. These are preferably screw threaded pins passing through and threaded into the extension 28 and vertically adjustable therein by any suitable means, such as a screw driver or like tool, in a transverse slot 42, and each provided at its upper end with a gauging surface 43. After adjustment it may be secured in adjusted position, for the upper end 43 to form a master gauging surface, by means of a set screw 44.

Also mounted in the extension 28 is a gauging means preferably in the form of a floating pin 45 provided with gauging surfaces 46 and 47 at its upper and lower ends respectively. It is mounted in the extension 28 to extend above and below the upper and lower surfaces thereof, and is preferably mounted in a hardened bushing 48 mounted in extension 28 by a close fit or other securing means. The pin is mounted for floating movement, or that is, vertical sliding movement in the bushing 48 and is secured therein by a set screw 49. The pin 45 is flattened on one side, as indicated at 50, providing shoulders 51 at its opposite ends cooperating with the end of the screw 49 which is closely adjacent the flat 50, to limit movements of the pin in the sleeve or bushing 48 to prevent the pin from dropping out. The screw and flat also prevent the pin from turning.

In operation, after a tool bit 52 is properly once set in the holder 13, the lower end of the pin 45 may be set to this tool, and setting of the gauge 29 by engagement of the pin 30 with its upper end, indicating this setting on the gauge. Then by swinging the gauge laterally about the pivot stud or screw 37 to a position over a master gauging screw 40 or 41, the top or master gauging surface 43 may be set according to the setting of the tool bit. Then for any subsequent setting of the tool bit the gauging pin 45 may be set to the same or any variation from this setting as desired, by first setting the gauge according to the master gauging surface 43 and then swinging the gauge back over the pin 45 and adjusting the tool bit against the lower end of this pin and adjusting it until the gauging surface 46 corresponds with the setting of the master gauging surface 43. Similarly, the other master gauging pin 41 may be set and its upper end used as a master gauging surface for setting the gauging pin 45 for proper setting of another tool.

It will be seen from the above that this is a very simple and effective device for accurately and quickly setting tool bits in tool holders, and after the proper setting for a tool bit has once been determined it can be readily and accurately reset in this position after separate grinding operations, or after a tool bit has been worn out a new bit can be quickly and accurately set in the same setting as the old bit.

Having thus set forth the nature of my invention, I claim:

1. A device for setting tool bits comprising a body member provided with locating surfaces in planes at an angle to each other to engage surfaces on a tool bit holder to locate the body in a given position thereon, a master gauging surface carried by the body, a gauging means mounted to float on the body and provided with gauging surfaces, one to be located in a given position relative to the gauging surface carried by the body and another to engage a tool bit in the holder for positioning said bit with respect to the holder, a gauge holder, and means mounting said gauge holder on the body for movement between a position for a gauge carried thereby to engage the master gauging surface and a position for the gauge to engage the first noted gauging surface on the floating gauging means to locate said means according to the position of the master gauging surface.

2. A device for setting tool bits comprising a body member, a master gauging surface carried by the body, locating surfaces carried by the body located in different planes to engage different surfaces of a tool holder to position the device on the holder, a gauging means including a gauging pin mounted to shift longitudinally of itself in the body provided with a gauging surface to be located in a given position relative to the master gauging surface and another gauging surface to engage a tool bit in the holder to position the bit therein, a gauge holder, and means mounting the gauge holder on the body for movement between a position for a gauge carried thereby to be positioned by the master gauging surface and a position for the gauge to be engaged by the first noted gauging surface on the pin to locate the pin according to the master gauging surface.

3. A device for setting tool bits comprising a body member, a master gauging surface carried by the body, locating surfaces carried by the body located in different planes to engage different surfaces of a tool holder to position the device on the holder, retaining means on the body to hold the device on the holder with the locating surfaces in engagement therewith comprising a magnet for operatively engaging said tool holder located between said surfaces and a spring between the magnet and the body so the pull of the magnet on the body is through the spring, gauging means mounted to shift relative to the body and provided with gauging surfaces, one arranged to be located in a given position relative to the master gauging surface and another to engage a tool in the holder for positioning said tool with respect to the holder, a gauge holder, and means mounting the gauge holder on the body for movement between a position for a gauge carried thereby to be positioned by the master gauging surface and a position for the gauge to be engaged by the first noted surface on the gauging means to position said means according to the master gauging surface.

4. The device for setting tool bits according to claim 3 in which the gauging means includes a gauging pin mounted in the body for longitudinal movement, and said pin provided at one end with the gauging surface arranged to be located in a given position relative to the master gauging surface by a gauge in the gauge holder to position the pin and at its other end with the surface to position the tool in the holder according to the positioning of the pin.

5. A device for setting tool bits according to claim 3 in which the body member comprises a top plate provided with an opening and oppositely inclined downwardly extending members on the under side of the plate on opposite sides of the opening carrying the locating surfaces, and the magnet is located in said opening.

6. A device for setting tool bits comprising a body member including a top plate and oppositely inclined downwardly extending members on the under side thereof carrying locating surfaces in different planes to engage a cylindrical tool holder to position the device on the holder, said plate including a portion at one end extending beyond the downwardly extending member, a vertically adjustable pin in the plate provided with a master gauging surface, a gauging means comprising a longitudinally shiftable pin mounted in the extension of the plate provided with gauging surfaces at its opposite ends one to cooperate with a gauge to position the pin according to the master gauging surface and the other to be engaged by a tool in the holder to position it, an upright gauge holder, a gauge mounted thereon, and means pivotally mounting the gauge holder to swing about an upright axis for shifting the gauge carried by this holder between positions over the pins for engagement with gauging surfaces carried by the pins.

7. A device for setting tool bits according to claim 6 in which there is means for securing the plate to the holder comprising a magnet for operatively engaging said tool holder located between the inclined downwardly extending members and a spring between the magnet and the body so the pull of the magnet on the body is through the spring.

8. A device for setting tool bits according to claim 6 in which the gauge holder comprises an angular member including an upright portion on which the gauge is mounted and a horizontal base portion, and means pivotally connecting said base portion to the plate comprising an upright bolt secured to the plate and passing through said base portion and a compression spring on said bolt between the base portion and a shoulder on the bolt adjacent its upper end.

References Cited in the file of this patent

UNITED STATES PATENTS

| 809,037 | Walker | Jan. 2, 1906 |
| 2,107,558 | Zimmerman | Feb. 8, 1938 |
| 2,337,248 | Koller | Dec. 21, 1943 |
| 2,375,448 | Talbot et al. | May 8, 1945 |
| 2,775,821 | Eipper et al. | Jan. 1, 1957 |